UNITED STATES PATENT OFFICE 2,270,052

MANUFACTURE OF HYDROCARBON PRODUCTS

Erwin M. Hattox, Baton Rouge, La., assignor to Standard Oil Development Company, a corporation of Delaware No Drawing. Application December 29, 1938, Serial No. 248,237

4 Claims. (Cl. 260—683)

This invention relates to the manufacture of polymerization products of hydrocarbons of the olefin series, and more particularly to the manufacture of tetraisobutylene.

Methods for the manufacture of polymerization products of olefin hydrocarbons by the polymerization of low molecular weight olefins, using as catalysts the anhydrous halides of aluminum, boron, etc., as well as clays, such as floridin, have been well known. These methods generally produce a mixture of a large number of polymers, many of which have too great a molecular weight for the desired end product.

In the present invention it is an object to produce liquid polymerization products of isobutylene of conveniently low viscosity, such as tetraisobutylene, which is a product well known in commerce and useful in the manufacture of detergents, wetting agents, etc. The raw materials to be used are chiefly isobutylene and diisobutylene, both of which are products readily obtainable in the petroleum industry.

It has been found, according to the present invention, that good yields of polymerization products of no higher molecular weight than tetraisobutylene may be obtained within a short reaction time by contacting isobutylene or diisobutylene with anhydrous ferric chloride, at a temperature of about 50° to 400° F., but preferably within the range of 150° to 300° F., and either at atmospheric pressure or at somewhat higher pressures. If fairly high temperatures are used, it is desirable to use also an elevated pressure, in order to cause the reaction to take place in the liquid phase. If the reaction is conducted in the gaseous phase, liquid diluents, such as heavy hydrocarbon oil, should be introduced into the reaction zone simultaneously with the raw materials in order to wash the catalyst free from accumulating polymer product. The product, after distillation, contains a large proportion of tetraisobutylene, and if it is desired to produce this compound as a sole product, it is only necessary to recycle the lower boiling cuts for further contacting with ferric chloride. Very high yields of the tetraisobutylene may thus be obtained, since there are no by-products of the polymerization other than various lower polymers, which may be returned to the reacting vessel as raw materials.

It has been found that the raw materials need not be limited to compositions containing polymers of lower degree than tetraisobutylene. If higher polymers are present, they will be depolymerized in the process, with the final production of polymers of not higher molecular weight than tetraisobutylene.

For the purpose of illustrating the present invention, the following example will be described in detail:

Example

A portion of diisobutylene was formed by first passing a mixture of butane, butylene and isobutylene, obtained by the fractionation of petroleum products, into sulfuric acid of about 60% strength and agitating the mixture in the cold, then heating the mixture to about 180 to 200° F. to form a mixture of polymers, which forms a separate layer upon cooling and settling, and finally separating the diisobutylene from said layer by fractionation. The product, which is believed to be a mixture of isomers, boiled at about 214° to 220° F. and had a gravity of about 64.4° A. P. I.

390 parts by weight of the diisobutylene so formed was placed in a reaction vessel with 34 parts by weight of anhydrous ferric chloride. The mixture was allowed to stand at room temperature for one-half hour and then refluxed for one hour. The product was filtered and washed with water. It was found to have a boiling range of 202° to 460° F., and, on analysis, was found to consist of 43% of diisobutylene, 14% of triisobutylene and 43% of tetraisobutylene. No polymers of higher molecular weight than tetraisobutylene were present. By separating the product into three cuts, products having the properties shown in the following table were obtained:

| Product | Boiling range | Determined bromine No. | Theoretical bromine No. |
|---|---|---|---|
| | °F. | | |
| Diisobutylene | 202–230 | 141 | 143 |
| Triisobutylene | 230–430 | 100 | 96 |
| Tetraisobutylene | 430–468 | 68 | 71 |

The invention is not to be limited to any specific examples which are presented here solely for the purpose of illustration, but is to be limited only by the appended claims, in which it is intended to claim all novelty inherent in the invention as broadly as the prior art permits.

I claim:

1. The method of producing polymers of isobutylene not higher in molecular weight than tetraisobutylene which comprises contacting diisobutylene with anhydrous ferric chloride at a temperature of about 150° to 300° F.

2. The method of producing tetraisobutylene which comprises contacting diisobutylene with anhydrous ferric chloride at a temperature of about 150° to 300° F.

3. The method of producing tetraisobutylene which comprises mixing about 390 parts by weight of diisobutylene with about 34 parts by weight of anhydrous ferric chloride, allowing the mixture so formed to stand for about one-half hour at room temperature, and then refluxing said mixture for about one hour.

4. The method of producing tetraisobutylene which comprises refluxing diisobutylene in the presence of anhydrous ferric chloride as a catalyst.

ERWIN M. HATTOX.